United States Patent
Lee et al.

(10) Patent No.: US 11,166,277 B2
(45) Date of Patent: Nov. 2, 2021

(54) COMMUNICATION METHOD USING FREQUENCY BAND OF BASE STATION IN WIRELESS COMMUNICATION SYSTEM, AND DEVICE USING METHOD

(71) Applicant: LG Electronics Inc., Seoul (KR)

(72) Inventors: Seungmin Lee, Seoul (KR); Suckchel Yang, Seoul (KR); Kijun Kim, Seoul (KR); Seonwook Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 16/346,933

(22) PCT Filed: Nov. 6, 2017

(86) PCT No.: PCT/KR2017/012496
§ 371 (c)(1),
(2) Date: May 2, 2019

(87) PCT Pub. No.: WO2018/084676
PCT Pub. Date: May 11, 2018

(65) Prior Publication Data
US 2020/0059930 A1    Feb. 20, 2020

Related U.S. Application Data

(60) Provisional application No. 62/417,361, filed on Nov. 4, 2016.

(51) Int. Cl.
*H04W 72/04* (2009.01)
*H04L 5/00* (2006.01)

(52) U.S. Cl.
CPC ..... *H04W 72/0453* (2013.01); *H04W 72/042* (2013.01); *H04W 72/048* (2013.01); *H04L 5/001* (2013.01)

(58) Field of Classification Search
CPC ..... H04L 5/001; H04L 1/1861; H04L 5/0046; H04W 72/0453; H04W 72/048; H04W 72/042

See application file for complete search history.

(56) References Cited

U.S. PATENT DOCUMENTS

2011/0085508 A1    4/2011  Wengerter et al.
2015/0382355 A1*  12/2015  Huang ............... H04L 5/00
                                              370/329

(Continued)

FOREIGN PATENT DOCUMENTS

WO    2016159656 A1    10/2016
WO    2016164739       10/2016

OTHER PUBLICATIONS

Interdigital Communication, "UE Support for Multiple Numerologies for NR," R1-1610022, 3GPP TSG-RAN WG1 #86bis, Lisbon, Portugal, Oct. 1, 2016, see section 2.1.

(Continued)

*Primary Examiner* — Charles C Jiang
*Assistant Examiner* — Voster Preval
(74) *Attorney, Agent, or Firm* — Dentons US LLP

(57) ABSTRACT

Provided are a communication method using a frequency band of a base station in a wireless communication system, and a device using the method. The method divides an entire frequency band so as to determine a plurality of subbands and transmits a transport block in at least one subband among the plurality of subbands, wherein the size of the transport block has a maximum value set so as to correspond to the entire frequency band size or the subband size.

6 Claims, 10 Drawing Sheets

(56) References Cited

U.S. PATENT DOCUMENTS

| | | | |
|---|---|---|---|
| 2016/0050667 A1* | 2/2016 | Papasakellariou | H04L 1/1822 370/329 |
| 2016/0183276 A1* | 6/2016 | Marinier | H04W 72/12 370/329 |
| 2016/0191175 A1* | 6/2016 | Hwang | H04B 15/00 370/329 |
| 2016/0227559 A1* | 8/2016 | Schober | H04L 5/006 |
| 2017/0063436 A1* | 3/2017 | Li | H04W 24/10 |
| 2017/0325155 A1* | 11/2017 | Zhou | H04L 5/005 |
| 2018/0213513 A1* | 7/2018 | Sun | H04L 27/2649 |
| 2018/0331808 A1* | 11/2018 | Li | H04L 1/1812 |

OTHER PUBLICATIONS

ZTE Corporation et al, "Discussion on Control Channel Design for NR MIMO," R1-166217, 3GPP TSG RAN WG1 Meeting #86, Gothenburg, Sweden, Aug. 13, 2016, see sections 2, 5; and figure 2.

Qualcomm Incorporated, "Scaled Numerology Control Design for NR," R1-166363, 3GPP TSG-RAN WG1 #86, Gothenburg, Sweden, Aug. 13, 2016, see sections 2.2-2.3.

* cited by examiner

COMMUNICATION METHOD USING FREQUENCY BAND OF BASE STATION IN WIRELESS COMMUNICATION SYSTEM, AND DEVICE USING METHOD

CROSS-REFERENCE TO RELATED APPLICATIONS

This application is the National Stage filing under 35 U.S.C. 371 of International Application No. PCT/KR2017/012496, filed on Nov. 6, 2017, which claims the benefit of U.S. Provisional Application No. 62/417,361 filed on Nov. 4, 2016, the contents of which are all hereby incorporated by reference herein in their entirety.

BACKGROUND OF THE INVENTION

Field of the Invention

The present invention relates to wireless communication, and more particularly, to a communication method using a frequency band of a base station in a wireless communication system, and a device using the method.

Related Art

International Telecommunication Union Radio (ITU-R) communication sector is proceeding with standardization of an International mobile telecommunication (IMT)-Advanced, a next-generation mobile communication system following the 3rd-generation. The IMT-Advanced aims at supporting Internet protocol (IP)-based multimedia services at a data rate of 1 Gbps in a stationary and low-speed movement state and at a data rate of 100 Mbps in a high speed movement state.

$3^{rd}$-generation partnership project (3GPP), a system standard that meets the requirements of the IMT-Advanced, prepares long term evolution (LTE)-Advanced by improving the LTE which is based on an orthogonal frequency division multiple access (OFDMA)/single carrier-frequency division multiple access (SC-FDMA) transmission scheme. The LTE-advanced is one of potential candidates for the IMT-Advanced.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication.

In addition, a communication system design considering a service or terminal sensitive to reliability and latency is being discussed, and a next-generation wireless access technology considering improved mobile broadband communication, massive MTC, URLLC (Ultra-Reliable and Low Latency Communication), or the like may be referred to as a new RAT (radio access technology) or NR.

In order to achieve a high data transfer rate, implementation in a very high frequency (mmWave) band (e.g., 60 GHz band, etc.) is considered under a new RAT (NR) system. In addition, since coverage of a signal becomes shorter when a frequency band becomes higher, a wider frequency band is required to compensate for this.

Meanwhile, a frequency band that can be used by a terminal may be significantly narrow compared to the entire wide frequency band of a system. A network may operate the frequency band by dividing the entire frequency band of the system into a plurality of subbands by considering capability of the terminal. Herein, for example, the network may transmit a specific signal (e.g., a synchronization signal, system information, etc.) for each subband, or may transmit it only on a specific subband.

Accordingly, the present invention provides a method regarding how to perform communication, when a base station performs communication using a divided frequency band.

SUMMARY OF THE INVENTION

The present invention provides a communication method using a frequency band of a base station in a wireless communication system, and a device using the method.

In one aspect, provided is a communication method using a frequency band of a base station in a wireless communication system. The method comprises determining a plurality of subbands by dividing an entire frequency band and transmitting a transport block on at least one subband among the plurality of subbands. A size of the transport block has a maximum value which is set to correspond to a size of the entire frequency band or a size of the subband.

Here, at least any one of a synchronization signal and system information is transmitted on the transport block.

Here, the plurality of subbands are determined based on user equipment (UE) capability information received by the base station.

Here, one transport block or transport blocks corresponding to a number of divided subbands is scheduled based on the set maximum value of the size of the transport block.

Here, a number of bits of acknowledgement (ACK)/not-acknowledgement (NACK) is 1, or a maximum value of bits of ACK/NACK is a value corresponding to the number of divided subbands.

Here, at least one of scheduling grants for the respective transport blocks is received in a transmission time interval (TTI) different from a TTI in which the remaining scheduling grants are received Here, a maximum value of soft channel bits for a UE for which the entire frequency band is configured has a value corresponding to a maximum value of the size of the transport block which is set to correspond to the size of the entire frequency band.

Here, a reference signal sequence is generated based on the entire frequency band and used by being divided by a size corresponding to the subband, or a plurality of reference signal sequences are generated based on the subband and used by connecting the generated plurality of reference signal sequences.

Here, a scrambling identity (ID) is set independently for each subband.

Here, at least one of channel state information (CSI) measurement, radio resource management (RRM) management, and sounding reference signal (SRS) transmission is performed for each subband.

Here, a control frequency band, at which scheduling information is transmitted, is designated only within a specific subband or designated for each subband among the plurality of subbands.

Here, if a subband of a first UE and a subband of a second UE are different from each other among the subbands on which the transport block is transmitted, at least one of subcarrier spacing of each of the different subbands and cyclic-prefix (CP) type is different.

In another aspect, provided is a communication device. The communication device comprises a radio frequency (RF) unit transmitting and receiving a radio signal, and a processor operatively coupled to the RF unit. The processor is configured to determine a plurality of subbands by dividing an entire frequency band and transmit a transport block on at least one subband among the plurality of subbands. A size of the transport block has a maximum value which is set to correspond to a size of the entire frequency band or a size of the subband.

According to the present invention, a frequency band that can be used by a terminal is narrow compared to the entire frequency band which becomes wide with the requirement of a wider frequency band. In this case, a base station determines a plurality of subbands by dividing the entire frequency band, and transmits a transport block on at least one subband among the plurality of subbands, wherein a size of the transport block has a maximum value which is set to correspond to a size of the entire frequency band or a size of the subband. Therefore, since communication is performed by using a proper frequency band according to capability, wireless communication efficiency can be maximized.

DESCRIPTION OF EXEMPLARY EMBODIMENTS

Figure 1:
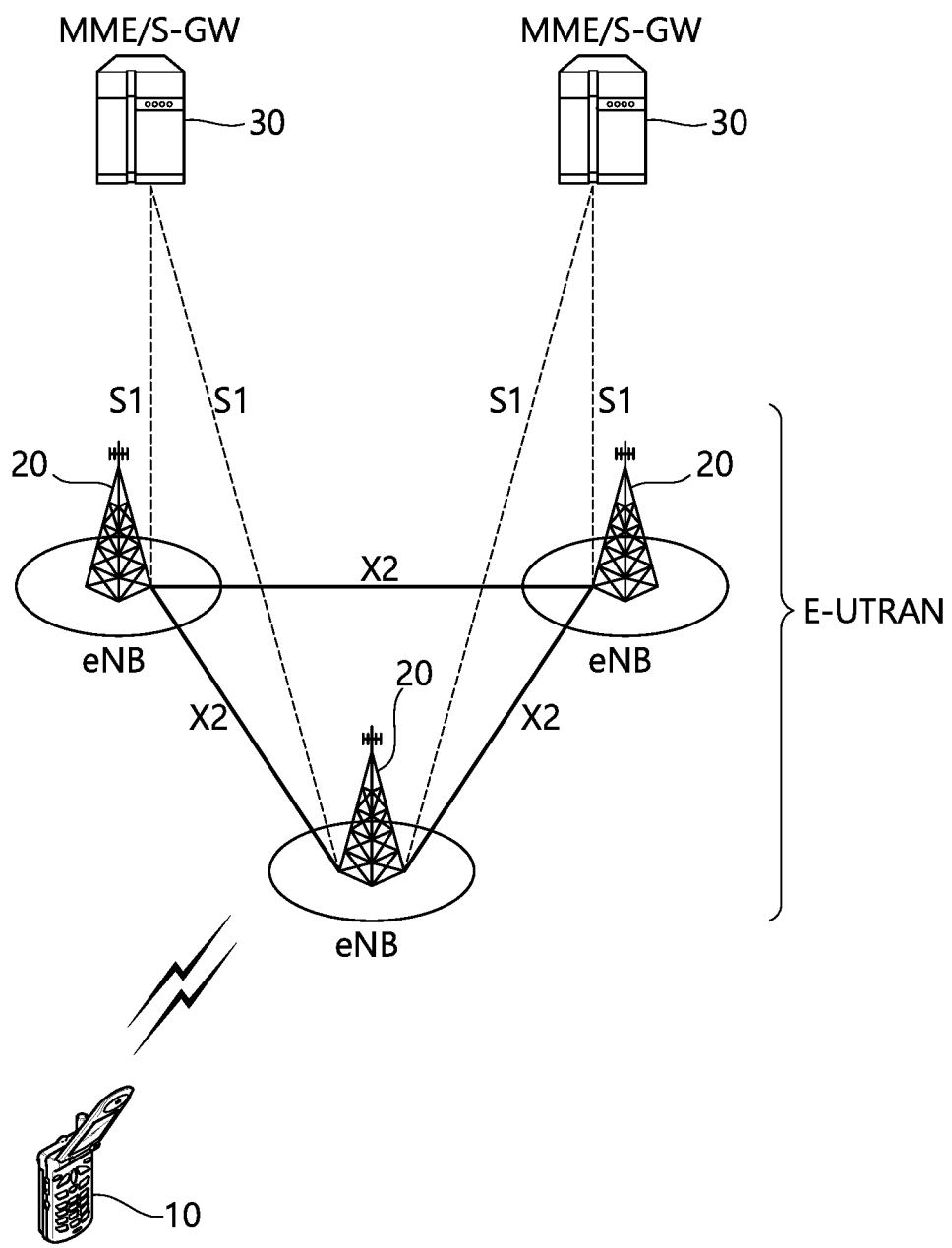
FIG. 1 shows a wireless communication system to which the present invention may be applied.

FIG. 1 shows a wireless communication system to which the present invention may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
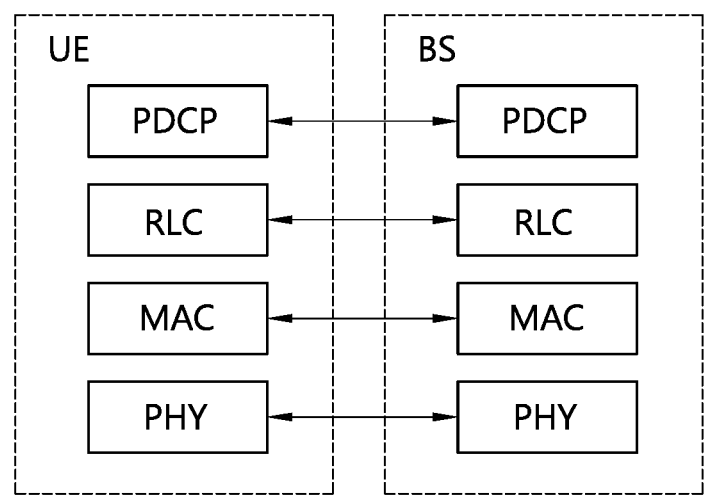
FIG. 2 is a diagram showing a wireless protocol architecture for a user plane.
Figure 3:
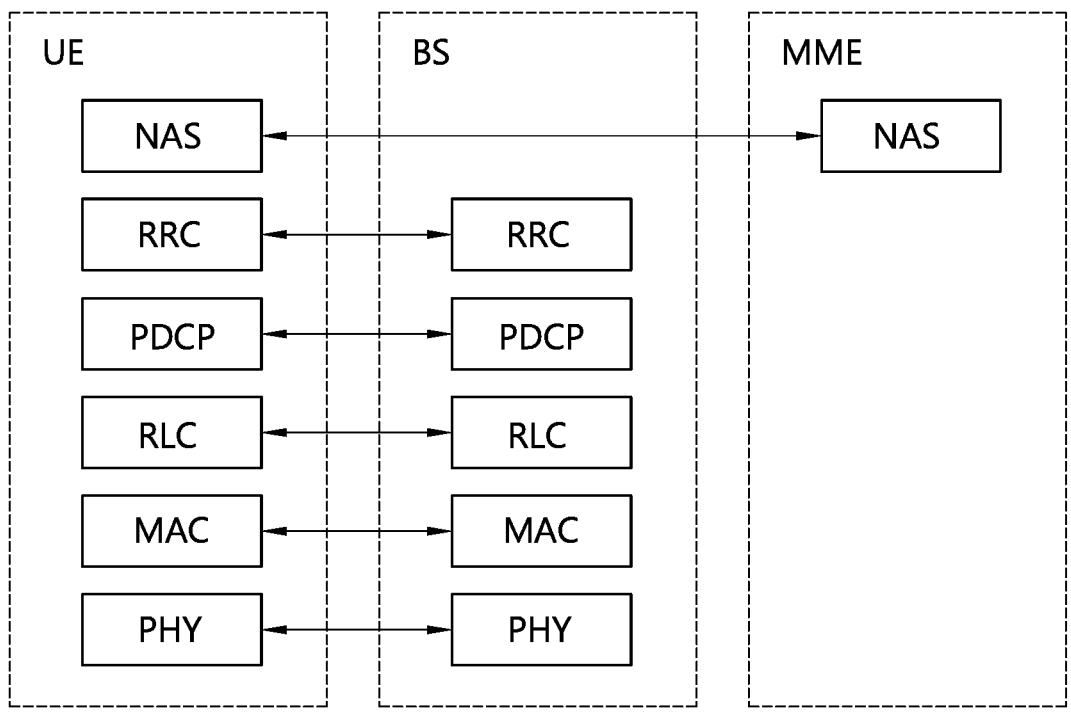
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Now, a carrier aggregation system is described. The carrier aggregation system is also called a multiple carrier system.

A 3GPP LTE system supports a case where a DL bandwidth and a UL bandwidth are differently configured, but one component carrier (CC) is a precondition in this case. A 3GPP LTE system supports a maximum of 20 MHz and may be different in a UL bandwidth and a DL bandwidth, but supports only one CC in each of UL and DL.

A carrier aggregation (also called a bandwidth aggregation or a spectrum aggregation) supports a plurality of CCs. For example, if 5 CCs are allocated as the granularity of a carrier unit having a 20 MHz bandwidth, a maximum of a 100 MHz bandwidth may be supported.

Figure 4:
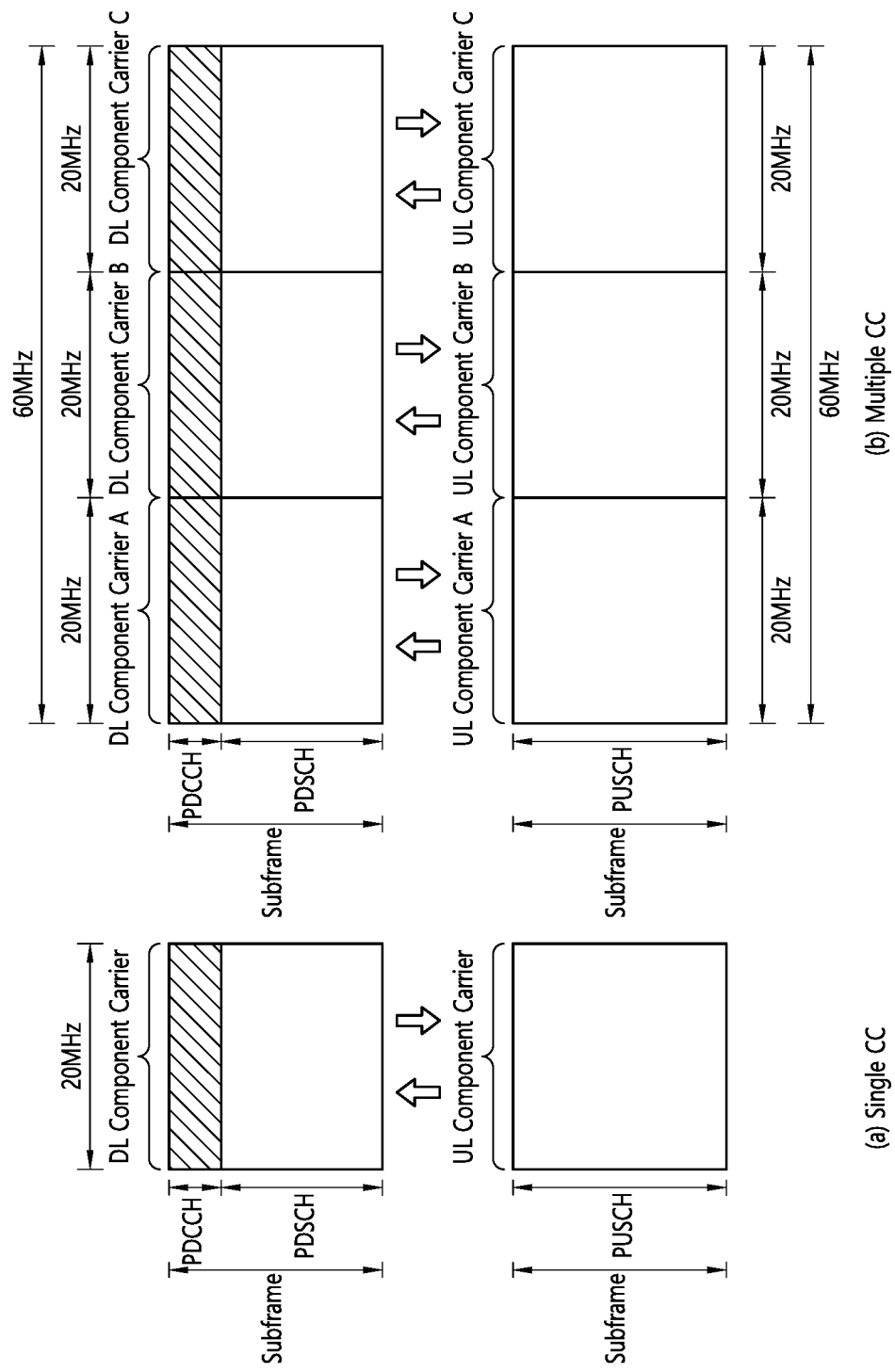
FIG. 4 shows an example of a comparison between a single carrier system and a carrier aggregation system.

FIG. 4 shows an example of a comparison between a single carrier system and a carrier aggregation system.

A carrier aggregation system (FIG. 4 (b)) has been illustrated as including three DL CCs and three UL CCs, but the number of DL CCs and UL CCs is not limited. A PDCCH and a PDSCH may be independently transmitted in each DL CC, and a PUCCH and a PUSCH may be independently transmitted in each UL CC. Or, a PUCCH may be transmitted only through a specific UL CC.

Since three pairs of DL CCs and UL CCs are defined, it can be said that a UE is served from three serving cells.

The UE may monitor PDCCHs in a plurality of DL CCs and receive DL transport blocks through the plurality of DL CCs at the same time. The UE may send a plurality of UL transport blocks through a plurality of UL CCs at the same time.

A pair of a DL CC #A and a UL CC #A may become a first serving cell, a pair of a DL CC #B and a UL CC #B may become a second serving cell, and a DL CC #C and a UL CC #C may become a third serving cell. Each serving cell may be identified by a cell index (CI). The CI may be unique within a cell or may be UE-specific.

The serving cell may be divided into a primary cell and a secondary cell. The primary cell is a cell on which the UE performs an initial connection establishment procedure or initiates a connection re-establishment procedure, or a cell designated as a primary cell in a handover process. The primary cell is also called a reference cell. The secondary cell may be configured after an RRC connection has been established and may be used to provide additional radio resources. At least one primary cell is always configured, and a secondary cell may be added/modified/released in response to higher layer signaling (e.g., an RRC message). The CI of the primary cell may be fixed. For example, the lowest CI may be designated as the CI of the primary cell.

The primary cell includes a downlink primary component carrier (DL PCC) and an uplink PCC (UL PCC) in view of a CC. The secondary cell includes only a downlink secondary component carrier (DL SCC) or a pair of a DL SCC and a UL SCC in view of a CC.

As described above, the carrier aggregation system may support a plurality of CCs, that is, a plurality of serving cells unlike the single carrier system.

Such a carrier aggregation system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carriers except for a component carrier fundamentally linked with the specific component carrier. That is, the PDCCH and the PDSCH may be transmitted through different DL CCs, and a PUSCH may be transmitted through a UL CC different from a UL CC linked with a DL CC to which a PDCCH including a UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

The carrier aggregation system for supporting the cross-carrier scheduling may include a carrier indicator field (CIF). In the system for supporting the cross-carrier scheduling, for example, an LTE-A system, since a CIF is added to an existing DCI format (that is, a DCI format used in an LTE), the number of bits may be further extended by 3 bits, and a PDCCH structure may reuse an existing coding method, a resource allocation method (that is, CCE based resource mapping), etc.

A BS may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the BS transmits a PDCCH with respect to a PDSCH/PUSCH to be scheduled through only the DL CCs included in the PDCCH monitoring DL CC group. The PDCCH monitoring DL CC group may be configured in a UE-specific, UE group-specific, or cell-specific manner.

Non-cross carrier scheduling (NCSS) is a scheduling method capable of performing resource allocation of a PDSCH transmitted through a specific component carrier through a PDCCH transmitted through the specific component carrier and/or resource allocation of a PDSCH transmitted through a component carrier fundamentally linked with the specific component carrier.

Hereinafter, a new radio access technology (new RAT) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, a communication system design considering a service or terminal sensitive to reliability and latency is being discussed, and a next-generation wireless access technology considering improved mobile broadband communication, massive MTC, URLLC (Ultra-Reliable and Low Latency Communication), or the like may be referred to as a new RAT (radio access technology) or NR.

In order to achieve a high data transfer rate, implementation in a very high frequency (mmWave) band (e.g., 60 GHz band, etc.) is considered under a new RAT (NR) system. In addition, since coverage of a signal becomes shorter when a frequency band becomes higher, a wider frequency band is required to compensate for this.

A frequency band that can be used by a terminal may be significantly narrow compared to the entire wide frequency band of a wireless communication system. Under the NR system, a network may operate the frequency band by dividing the entire frequency band of the system into a plurality of subbands by considering capability of the terminal. Herein, for example, the network may transmit a specific signal (e.g., a synchronization signal, system information, etc.) for each subband, or may transmit it only on a specific subband.

Hereinafter, the aforementioned subband will be described. Herein, the subband may be interchangeably interpreted as a bandwidth part (BWP). In addition, hereinafter, for convenience of explanation, a single (wideband) carrier from a perspective of a UE configured or signaled from a network or a BS (or a (wideband) carrier operated from a perspective of the BS) is named as WB-UCARRIER, and a carrier operated from a perspective of the network or the BS (or a frequency(/subband) (resource) which is a basic communication (frequency) band from a perspective of the UE (e.g., a (part of) BWP on WB-UCARRIER)) is named as SB-UCARRIER. Herein, a plurality of SB-UCARRIERs may be included in the WB-UCARRIER.

In addition, hereinafter, CC may be interchangeably interpreted as a cell (or a carrier or a bandwidth part). In addition, SB-UCARRIER may be interchangeably interpreted as a bandwidth part (or a subband or a CC or a cell or a carrier).

In addition, WB-UCARRIER may be interchangeably interpreted as a (single) carrier (or the entire frequency band or a CC or a cell or a bandwidth part).

The bandwidth part has the following characteristic compared to the conventional technique.

1. When a BS configures one component carrier (CC) to a UE, the CC may consist of one or a plurality of bandwidth parts. Herein, a bandwidth of one bandwidth part may be less than or equal to maximal bandwidth capability of the UE.

Herein, a bandwidth part including a synchronization signal (SS) block for which the UE has succeeded in initial access is basically included in a configuration of a bandwidth part constituting a primary component carrier (PCC). Herein, for example, the SS block may include a primary SS (PSS), a secondary SS (SSS), and a physical broadcast channel (PBCH).

In addition, herein, whether the SS block exists for each bandwidth part may be configured by the BS.

In addition, herein, transmission of one or a plurality of SS blocks may be configured on a wideband CC. Herein, in case of a non-carrier aggregation (non-CA) UE having smaller bandwidth capability, a gap may be configured for a measurement operation (e.g., radio resource management (RRM), path loss, etc.) using the SS block. Herein, the gap may include RF returning time or the like.

2. An operation of a fallback to a default bandwidth part is defined on a timer basis. Herein, for example, the operation may have a purpose of avoiding a situation in which downlink control information (DCI) decoding fails continuously on a current active DL BWP.

Herein, for example, when the timer expires, switching may be achieved from the current active DL BWP to the default DL BWP. Herein, the timer may restart when the UE successfully decodes the DCI on the current active DL BWP before the timer expires.

In addition, herein, for example, the default DL BWP may be a bandwidth part including an SS block for which initial access is successful. However, it may be changed to another bandwidth part according to a configuration of the BS.

3. A numerology (e.g., subcarrier spacing, cyclic-prefix (CP) type, etc.) may be configured differently between different bandwidth parts.

4. A DCI-based BWP switching operation is supported. Herein, for example, a BWP index field on the DCI may be included.

5. In case of a UE with limited capability (e.g., a UE or the like of which bandwidth capability is limited to one BWP), the UE may require RF returning time when a switching operation is performed between BWPs having different center frequencies.

In other words, the biggest difference of a BWP configuration with respect to the conventional wireless communication technique such as carrier aggregation (CA) or the like is that, conventionally, synchronization, data communication, or the like applied on CC basis can be individually applied for each BWP in one CC.

Hereinafter, the present invention will be described.

As described above, a frequency band that can be used by a terminal may be significantly narrow compared to the entire wide frequency band of a system. A network may operate the frequency band by dividing the entire frequency band of the system into a plurality of subbands by considering capability of the terminal.

Accordingly, the present invention provides a method regarding how to perform communication, when the BS performs communication using the entire frequency band and subband of a system.

For example, under a new RAT (NR) system, a network (/BS) may operate by dividing the entire system (wide) band into a plurality of subbands by considering limited capability of (some) UE.

Herein, for example, the (corresponding) network(/BS) may transmit "common signaling" (e.g., a synchronization signal(Primary Synchronization Signal (PSS)/Secondary Synchronization Signal (SSS)) and/or system information (Physical Broadcast Channel (PBCH)/System Information Block (SIB)), etc.) (entirely) for each subband (for the UE with limited capability) (case A) and/or may transmit it only on (pre-defined(/signaled)) specific (some) subband(s) (case B).

Herein, for example, hereinafter, for convenience of explanation, a single (wideband) carrier from a perspective of a UE configured(/signaled) from a network(/BS) (or a (wideband) carrier operated from a perspective of the BS) is named as "WB-UCARRIER", and a (subband) carrier (herein, a plurality of K carriers are included in (corresponding) WB-UCARRIER) operated from a perspective of the network(/BS) (or a frequency(/subband) (resource) which is a basic communication (frequency) band from a perspective of the UE (e.g., a (part of) BWP on WB-UCARRIER)) is named as "SB-UCARRIER". Herein, SB-UCARRIER may be interchangeably interpreted as a subband (or a bandwidth part or a CC or a carrier). In addition, herein, WB-UCARRIER may be interchangeably interpreted as the entire frequency band (or a (single) carrier or a CC or a cell or a bandwidth part), and may be a wideband CC. In addition, herein, a carrier may be interchangeably interpreted as a cell (or a component carrier (CC) or a bandwidth part). Herein, for example, a (corresponding) UE may be allowed to perform communication according to a (part of) the following rule.

Figure 5:
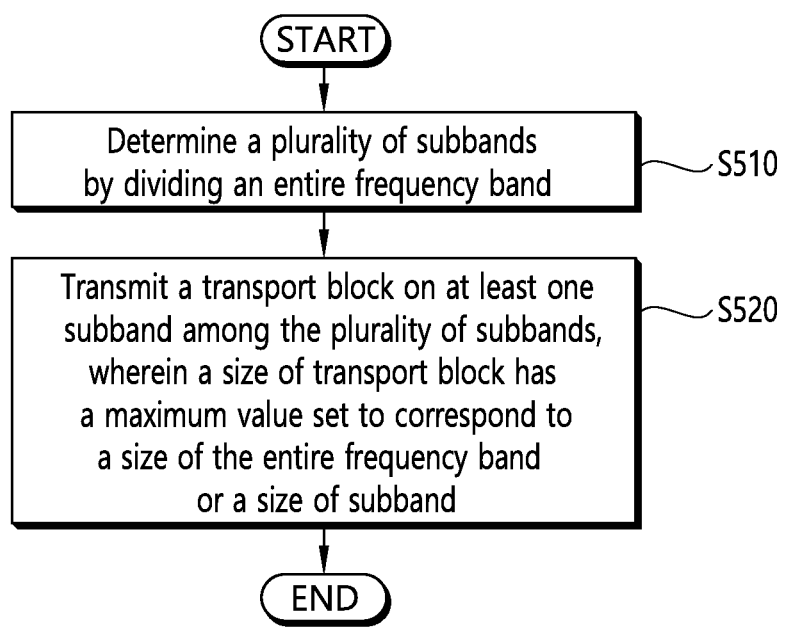
FIG. 5 is a flowchart of a communication method using a frequency band of a BS according to an embodiment of the present invention.

FIG. 5 is a flowchart of a communication method using a frequency band of a BS according to an embodiment of the present invention.

Referring to FIG. 5, the BS determines a plurality of subbands by dividing the entire frequency band (S510).

Thereafter, the BS transmits a transport block on at least one subband among the plurality of subbands, wherein a size of the transport block has a maximum value which is set to correspond to a size of the entire frequency band or a size of the subband (S520). Herein, for example, at least any one of a synchronization signal and system information may be transmitted on the transport block. In addition, for example, the plurality of subbands may be determined based on UE's capability information received by the BS. In addition, for example, one transport block or transport blocks corresponding to the number of divided subbands may be scheduled based on the set maximum value of the transport block size. In addition, for example, the number of bits of acknowledgement (ACK)/not-acknowledgement (NACK) may be 1, or a maximum value thereof may be a value corresponding to the number of divided subbands. In addition, for example, at least one of scheduling grants for the respective transport blocks may be received in a transmission time interval (TTI) different from a TTI in which the remaining scheduling grants are received. In addition, for example, a maximum value of soft channel bits for a UE for which the entire frequency band is configured may have a value corresponding to a maximum value of the transport block size which is set to correspond to the size of the entire frequency band. In addition, for example, a reference signal sequence may be generated based on the entire frequency band and then used by being divided by a size corresponding to the subband, or a plurality of reference signal sequences may be generated based on the subband and then used by connecting the generated plurality of reference signal sequences. In addition, for example, a scrambling identity (ID) may be set independently for each subband. In addition, for example, at least any one of channel state information (CSI) measurement, radio resource management (RRM) management, and sounding reference signal (SRS) transmission may be performed for each subband. In addition, for example, a control frequency band at which scheduling information is transmitted may be designated only within a specific subband or designated for each subband among the plurality of subbands. In addition, for example, if a subband of a first UE and a subband of a second UE are different from each other among the subbands on which the transport block is transmitted, at least any one of subcarrier spacing of each of the different subbands and cyclic-prefix (CP) type may be different.

Hereinafter, a specific example in which a BS performs communication using a frequency band is described with reference to FIG. 5.

As described above, the BS may transmit a plurality of subbands by dividing the entire frequency band, and may transmit a transport block on at least one subband among the plurality of subbands, wherein a size of the transport block has a maximum value which is set to correspond to a size of the entire frequency band or a size of the subband. In other words, conventionally, when multiple-input multiple-output (MIMO) is not applied, up to one transport block exists per component carrier in each TTI, whereas according to the aforementioned embodiment, for example, when it is determined by dividing the entire frequency band into K subbands, up to K transport blocks may exist per component carrier in each TTI. In addition, a specific example thereof is as follows.

[Proposed method #1] For example, in case of (OPTION #1-1), "maximal transport block size (MAX TBS)" may be set (to be great) to correspond to a WB-UCARRIER (band) size and (only) a single TB may be scheduled in the entire WB-UCARRIER, or in case of (OPTION #1-2), "MAX TBS" may be set to correspond to an SB-UCARRIER (band) size and a plurality of TB(s) may be scheduled by the number of (K) SB-UCARRIERs (included in WB-UCARRIER).

Herein, for example, in case of (OPTION #1-2) (and/or (OPTION #1-1)), an individual grant may be transmitted for (each) TB (e.g., transmission of a plurality of grant(s) is required to schedule a plurality of TB(s)), and/or the plurality of TB(s) may be simultaneously scheduled only with a (pre-defined) single grant.

Herein, for example, in case of (OPTION #1-2) (and/or (OPTION #1-1)), a region spanned(/mapped) by a single TB may be limited to be within a single SB-UCARRIER, and/or the single TB may be spanned(/mapped) without a boundary between SB-UCARRIERs (and/or between a plurality of pre-configured(/signaled) SB-UCARRIER(s)).

Herein, for example, when a single TB is transmitted on (total) WB-UCARRIER (according to (OPTION #1-1) (and/or (OPTION #1-2)), in case (A), "total coded bit(s)" may be (equally) divided by the number of SB-UCARRIERs and thereafter (independent) interleaving is applied for (each) divided "coded bit(s)" to map corresponding each (interleaving) result for each SB-UCARRIER, and/or in case (B), "total coded bit(s)" may be (preferentially) interleaved and thereafter a corresponding (interleaving) result is (equally) divided by the number of SB-UCARRIERs to map (each) divided "coded bit(s)" for each SB-UCARRIER, and/or in case (C), "total coded bit(s)" may be (preferentially) interleaved and thereafter a corresponding (interleaving) result may be mapped on WB-UCARRIER.

Herein, for example, when communication based on (single) WB-UCARRIER is performed (according to (OPTION #1-1) (and/or (OPTION #1-2)), "MAX TBS" on (single) WB-UCARRIER may be configured based on "MAX {nominal carrier bandwidth, configured carrier bandwidth}" (herein, for example, "MAX {X, Y}" indicates a function for deriving a greater value between X and Y) or the number of PRBs corresponding thereto.

Herein, for example, when communication based on (single) WB-UCARRIER is performed (according to (OPTION #1-1) (and/or (OPTION #1-2)), the number of "MIN storing (soft channel) bits" per TB may be configured to be in proportion to a (carrier) bandwidth size (e.g., in proportion to a (MAX) TBS size per carrier).

As described above, a maximum value of soft channel bits for a UE for which the entire frequency band is configured may have a value corresponding to a maximum value of the transport block size which is set to correspond to the size of the entire frequency band. In addition, a specific example thereof is as follows. [107] [Proposed method #2] For example, a UE configured(/signaled) with WB-UCARRIER (from a network(/BS)) may assume that "MAX TOTAL NUMBER OF SOFT CHANNEL BITS" (and/or "MAX SOFT BUFFER SIZE") has a value corresponding to "MAX TBS" based on a (corresponding) WB-UCARRIER (bandwidth) (e.g., a value corresponding to K times "MAX TBS" based on SB-UCARRER (bandwidth)).

Herein, for example, under the above assumption, if the number of "MAX HARQ processes" per SB-UCARRIER is "8", in case of (OPTION #1-1), a total soft buffer (of the UE) may be divided into "8" parts, and/or in case of (OPTION #1-2), the total soft buffer (of the UE) may be divided into "8*K" parts (e.g., it may be assumed that the number of, "total (MAX) HARQ processes" is "8*K").

As described above, the number of bits of acknowledgement (ACK)/not-acknowledgement (NACK) may be 1, or a maximum value thereof may be a value corresponding to the number of divided subbands. In other words, for example, MAX TBS may be set to correspond to a size of the entire frequency band, and when one transport block is scheduled based thereon, the number of bits of ACK/NACK information may be 1. Herein, when the MAX TBS is set to correspond to the size of the entire frequency band and a UE which can be scheduled for this receives a plurality of transport blocks for a subband in which the entire frequency band is divided into K frequency bands, the UE may consider this as one transport block and configure an ACK/NACK information bit. In addition, for example, when the MAX TBS is set to correspond to a subband size and the number of divided subbands is K, the maximum number of ACK/NACK information bits may be K if K transport blocks are scheduled. Herein, even if the number of divided subbands is K and thus K transport blocks are scheduled, the number of ACK/NACK information bits may be 1 by considering singular ACK/NACK information for the entire K transport blocks.

Figure 6:
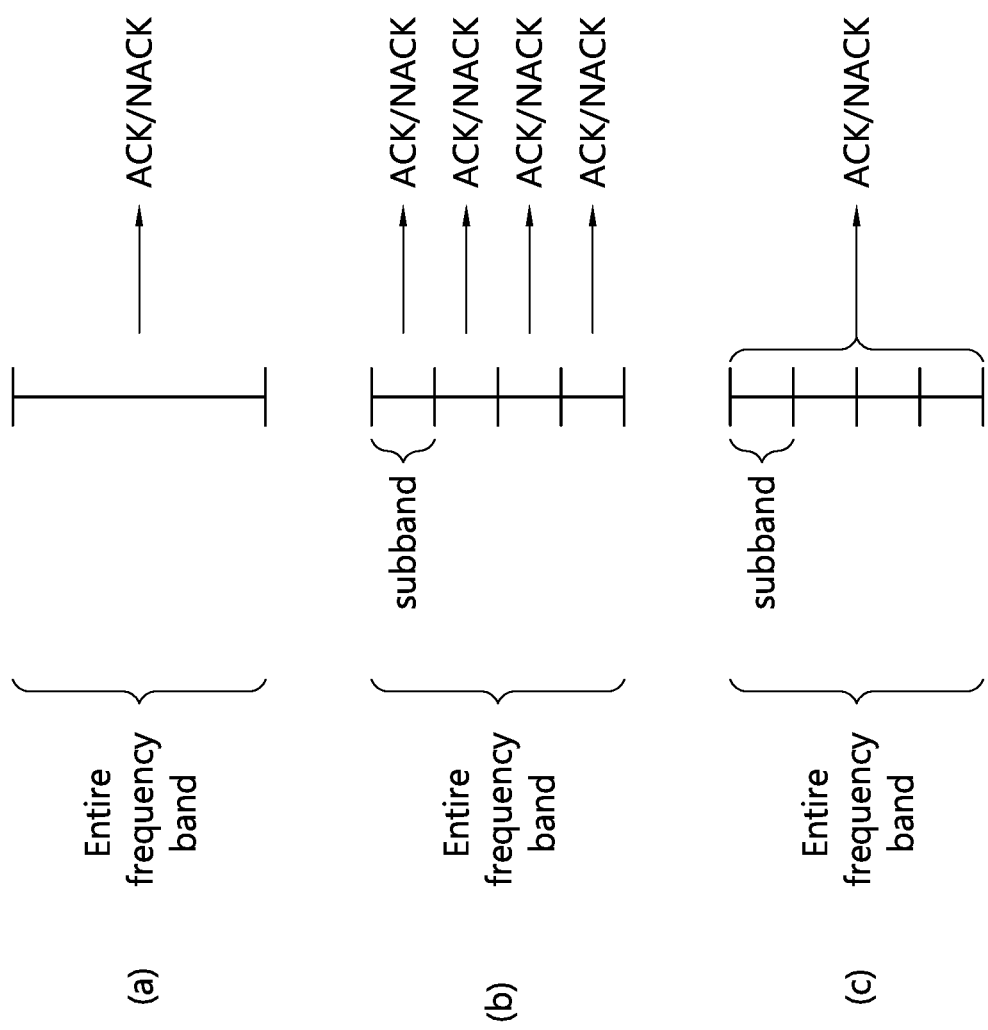
FIG. 6 shows an example of a method of configuring an ACK/NACK information bit according to an embodiment of the present invention.

FIG. 6 shows an example of a method of configuring an ACK/NACK information bit according to an embodiment of the present invention.

FIG. 6(a) shows an example in which, if MAX TBS is set to correspond to a size of the entire frequency band, one transport block is scheduled to configure an ACK/NACK information bit consisting of 1 bit. FIG. 6(b) shows an example in which, if the entire frequency band is divided into four subbands and MAX TBS is set to correspond to a subband size, four transport blocks are scheduled to configure an ACK/NACK information bit consisting of 4 bits. FIG. 6(c) shows an example in which, if MAX TBS is set to correspond to the size of the entire frequency band, when a UE receives four transport blocks for a subband in which the entire frequency band is divided into 4 frequency bands, this is regarded as one transport block to configure one ACK/NACK information bit. In addition, a specific example thereof is as follows.

[Proposed method #3] For example, in case of (OPTION #1-2), configuration(/reporting) of ACK/NACK information of K bits corresponding to up to K TB(s) (and/or ACK/NACK information consists of bits of which number is less than K by applying a predefined bundling scheme) may be defined. Herein, for example, for "(ACK/NACK bit) ordering" between (corresponding) ACK/NACK information, "assist signaling" (e.g., a counter-DAI field (on grant)) may be defined.

As described above, a reference signal sequence may be generated based on the entire frequency band and then used by being divided by a size corresponding to the subband, or a plurality of reference signal sequences may be generated based on the subband and then used by connecting the generated plurality of reference signal sequences.

Figure 7:
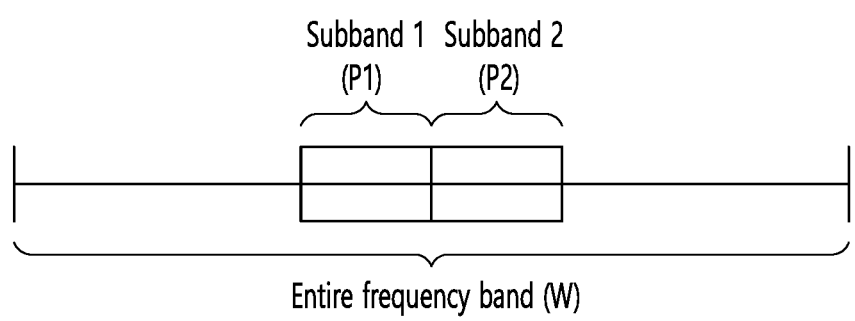
FIG. 7 shows an example of a method of generating and using a reference signal sequence according to an embodiment of the present invention.

FIG. 7 shows an example of a method of generating and using a reference signal sequence according to an embodiment of the present invention.

According to FIG. 7, for example, when a UE performs communication through a subband 1 with a bandwidth P1 and a subband 2 with a bandwidth P2 with respect to the entire frequency band W, a reference signal sequence may be generated based on W and thereafter may be used by dividing only a part corresponding to P1 and P2, or the reference signal sequence for a part corresponding to P1 and a part corresponding to P2 may be generated and thereafter may be used by connecting these parts. In addition, herein, a scrambling identity (ID) may be configured independently for each subband. In addition, a specific example thereof is as follows.

[Proposed method #4] For example, a reference signal (e.g., CSI-RS, SRS) sequence may be generated(/configured) (preferentially) on a WB-UCARRIER (band) basis and an "SB-UCARRIER capable UE" may be allowed to use(/apply) it (in communication based on SB-UCARRIER) by being divided by a size corresponding to an SB-UCARRIER (band), and/or the reference signal sequence may be generated(/configured) (preferentially) on an SB-UCARRIER (band) basis and a "WB-UCARRIER capable UE" may be allowed to use(/apply) it (in communication based on WB-UCARRIER) by connecting a plurality of (K) (corresponding) reference signal sequences.

For example, a "(data/control/RS) scrambling (sequence generator) ID" may be independently (or differently) configured(/signaled) per each SB-UCARRIER (and/or a "(data/control/RS) scrambling (sequence generator) ID" related to (a plurality of) SB-UCARRIER(s) included in the same (one) WB-UCARRIER may be configured(/signaled) by using a common value).

As described above, at least any one of channel state information (CSI) measurement, radio resource management (RRM) management, and sounding reference signal (SRS) transmission may be performed for each subband. In addition, a specific example thereof is as follows.

[Proposed method #5] For example, a UE may be allowed to perform(/report) a "CSI measurement(/report) (e.g., desired signal/interference measurement)" operation and/or an "RRM measurement(/report)" operation and/or an "SRS transmission" operation or the like (independently) on a (pre-configured(/signaled)) NB-UCARRIER (set) basis, and/or may be allowed to perform(/report) the operations with respect to the entire WB-UCARRIER.

Herein, for example, a "CSI measurement(/report)" operation (e.g., in particular, when TB of an independent modulation and coding scheme (MCS) is transmitted per NB-UCARRIER) and/or an "SRS transmission" operation may be allowed to be (independently) performed(/reported) on a NB-UCARRIER basis, and an "RRM measurement(/report)" operation may be allowed to be performed(/reported) for the entire WB-UCARRIER (or (independently) on a NB-UCARRIER basis).

As described above, a control frequency band in which scheduling information is transmitted may be designated only within a specific subband or designated for each subband among the plurality of subbands. In addition, a specific example thereof is as follows.

[Proposed method #6] For example, a "control (sub)band (CNTSBAND)" on which grant(/scheduling information) is transmitted may be designated only in a specific (one) pre-configured(/signaled) SB-UCARRIER (e.g., "cross subband scheduling case"), and/or a (individual) CNTSBAND may be designated for (each) SB-UCARRIER (e.g., "self subband scheduling case").

Herein, for example, (in particular, in the former case), on a DCI related to aperiodic CSI (A-CSI) (report) triggering, an "SB-UCARRIER index field" may be defined to report a type of SB-UCARRIER to which A-CSI (report) triggering is related.

For example, a WB-UCARRIER based operation may be configured(/signaled) in DL communication (or UL communication), and an SB-UCARRIER based operation may be configured(/signaled) in UL communication (or DL communication) (and/or a WB-UCARRIER type(/operation) may be configured(/signaled) in case of DL communication (or UL communication), and an "aggregation" type(/operation) of a plurality of SB-UCARRIER(s) may be configured (/signaled) for UL communication (or DL communication) (e.g., it may be interpreted that DL communication and UL communication related bandwidths are different)).

Herein, for example, if the WB-UCARRIER type(/operation) is configured(/signaled) also for UL communication, a demodulation-reference signal (DM-RS) sequence may be generated(/configured) on an SB-UCARRIER basis, and (likewise) discrete Fourier Transform (DFT) may be applied on an SB-UCARRIER basis.

For example, uplink control information (UCI) (e.g., ACK/NACK, CSI, SR, etc.) related to a plurality of SB-UCARRIERs may be transmitted(/reported) (only) through a specific (one) pre-configured(/signaled) SB-UCARRIER (e.g., it can be interpreted as a sort of "primary SB-UCARRIER").

Herein, for example, it may be configured(/signaled) such that DCI reception(/transmission) and/or RRM measurement operations are limitedly performed (only) on a (corresponding) primary SB-UCARRIER.

Herein, for example, "activation/deactivation" related to "secondary SB-UCARRIER (for example, it can be interpreted as the remaining SB-UCARRIER(s) other than the primary SB-UCARRIER)" may be indicated through predefined signaling (e.g., DCI, MAC CE, etc.).

For example, QCL assumption may be configured(/signaled) independently (or differently) for each pre-configured (/signaled) SB-UCARRIER (set) (e.g., when a TRP (identifier) differs for each SB-UCARRIER (set) (e.g., "COMP case")).

For example, "retransmission" for "initial transmission" performed(/scheduled) on a specific SB-UCARRIER may be accepted(/performed) only on the (corresponding) same SB-UCARRIER, and/or may also be accepted(/performed) on a pre-configured(/signaled) different SB-UCARRIER(s) (set).

As described above, at least one of scheduling grants for the respective transport blocks may be received in a transmission time interval (TTI) different from a TTI in which the remaining scheduling grants are received. In addition, a specific example thereof is as follows.

[Proposed method #7] (When the (some) proposed methods are applied), several TB(s) may be (simultaneously) scheduled (through a plurality of SB-UCARRIER(s)) on a specific TTI (for example, a subframe/slot).

Herein, for example, TTI(s) on which grant(s) for scheduling each of TB(s) may be (partially) different. Specifically, for example, when two TB(s) are scheduled on TTI #N, one TB may be scheduled on TTI #(N-K), and the other (remaining) one TB may be scheduled on TTI #(N-M).

Herein, for example, a UE may be allowed to assume that all grant(s) are valid if resource allocation(s) related to (corresponding) (two) grant(s) is "disjoint", and/or may be allowed to assume that only a most recently (or first) (successfully) received grant is valid if the resource allocation(s) related to (corresponding) (two) grant(s) (partially) overlaps.

Figure 8:
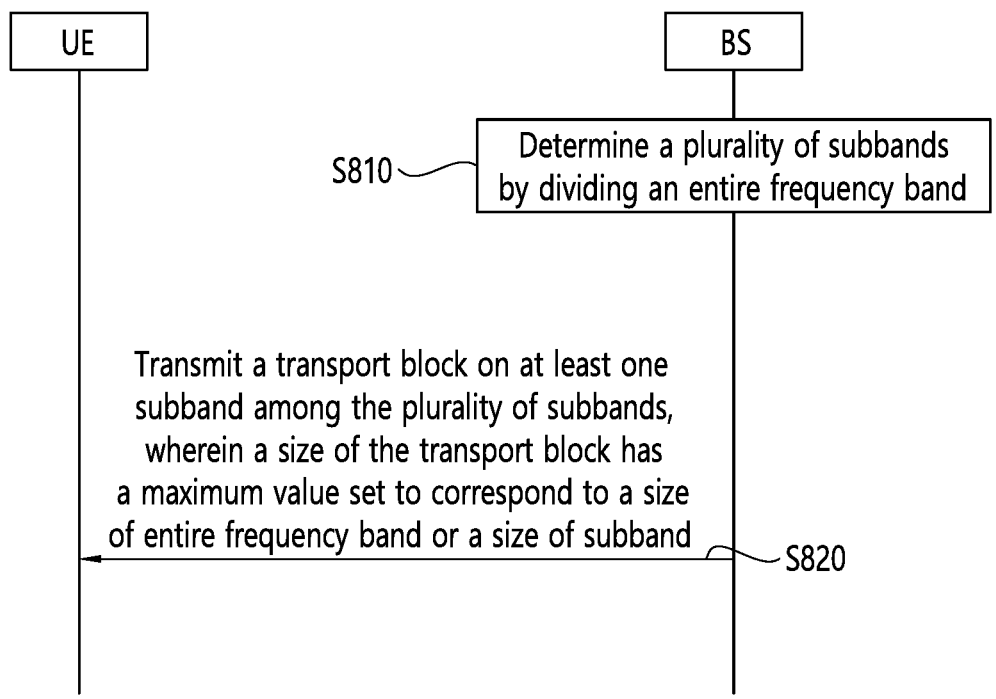
FIG. 8 is a flowchart of a method of performing communication using a frequency band of a BS according to another embodiment of the present invention.

FIG. 8 is a flowchart of a method of performing communication using a frequency band of a BS according to another embodiment of the present invention.

Referring to FIG. 8, the BS may determine a plurality of subbands by dividing the entire frequency band (S810).

Thereafter, the BS may transmit a transport block on at least one subband among the plurality of subbands, wherein a size of the transport block may have a maximum value which is set to correspond to a size of the entire frequency band or a size of the subband (S820).

Herein, for example, at least any one of a synchronization signal and system information may be transmitted on the transport block. In addition, for example, the plurality of subbands may be determined based on UE's capability information received by the BS. In addition, for example, one transport block or transport blocks corresponding to the number of divided subbands may be scheduled based on the set maximum value of the transport block size. In addition, for example, the number of bits of acknowledgement (ACK)/not-acknowledgement (NACK) may be 1, or a maximum value thereof may be a value corresponding to the number of divided subbands. In addition, for example, at least one of scheduling grants for the respective transport blocks may be received in a transmission time interval (TTI) different from a TTI in which the remaining scheduling grants are received. In addition, for example, a maximum value of soft channel bits for a UE for which the entire frequency band is configured may have a value corresponding to a maximum value of the transport block size which is set to correspond to the size of the entire frequency band. In addition, for example, a reference signal sequence may be generated based on the entire frequency band and then used by being divided by a size corresponding to the subband, or a plurality of reference signal sequences may be generated based on the subband and then used by connecting the generated plurality of reference signal sequences. In addition, for example, a scrambling identity (ID) may be set independently for each subband. In addition, for example, at least any one of channel state information (CSI) measurement, radio resource management (RRM) management, and sounding reference signal (SRS) transmission may be performed for each subband. In addition, for example, a control frequency band at which scheduling information is transmitted may be designated only within a specific subband or designated for each subband among the plurality of subbands. In addition, for example, if a subband of a first UE and a subband of a second UE are different from each other among the subbands on which the transport block is transmitted, at least any one of subcarrier spacing of each of the different subbands and cyclic-prefix (CP) type may be different. Herein, since a specific example for each of the exemplary cases is the same as described above, redundant examples will be omitted.

Figure 9:
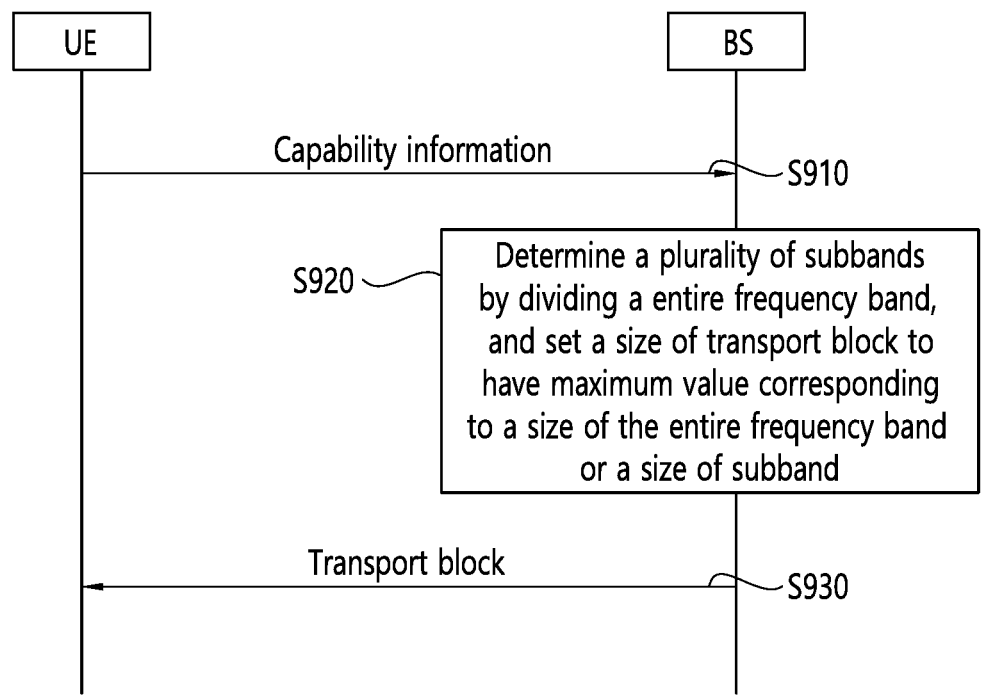
FIG. 9 is a flowchart of a method of performing communication using a frequency band of a BS according to another embodiment of the present invention.

FIG. 9 is a flowchart of a method of performing communication using a frequency band of a BS according to another embodiment of the present invention.

Referring to FIG. 9, a UE may transmit capability information to the BS (S910). Herein, for example, the capability information may be UECapabilityInformation, which may include information on a frequency band or bandwidth that can be accepted by the UE. In addition, herein, the capability information may refer to the section 6.2.2 of 3GPP TS 36.331 V14.0.0 (2016-09) "Technical Specification Group Radio Access Network; Evolved Universal Terrestrial Radio Access (E-UTRA); Radio Resource Control (RRC); Protocol specification (Release 14)". However, this is for exemplary purposes only, and specific and individual information included in the capability information may change variously.

Thereafter, the BS may divide the entire frequency band to determine a plurality of subbands by considering the received capability information, and may set a size of a transport block to have a maximum value corresponding to a size of the entire frequency band or a size of the subband (S920).

Thereafter, the BS may transmit the transport block to the UE on at least one subband among the plurality of subbands (S930).

Herein, for example, at least any one of a synchronization signal and system information may be transmitted on the transport block. In addition, for example, the plurality of subbands may be determined by the UE's capability information received by the BS. In addition, for example, one transport block or transport blocks corresponding to the number of divided subbands may be scheduled based on the maximum value of the determined transport block size. In addition, for example, the number of bits of ACK/NACK information may be 1, or a maximum value thereof may be a value corresponding to the number of divided subbands. In addition, for example, at least one of scheduling grants for the respective transport blocks may be received in a transmission time interval (TTI) different from a TTI in which the remaining scheduling grants are received. In addition, for example, a maximum value of soft channel bits for a UE for which the entire frequency band is configured may have a value corresponding to a maximum value of the transport block size which is set to correspond to the size of the entire frequency band. In addition, for example, a reference signal sequence may be generated based on the entire frequency band and then used by being divided by a size corresponding to the subband, or a plurality of reference signal sequences may be generated based on the subband and then used by connecting the generated plurality of reference signal sequences. In addition, for example, a scrambling identity (ID) may be set independently for each subband. In addition, for example, at least any one of channel state information (CSI) measurement, radio resource management (RRM) management, and sounding reference signal (SRS) transmission may be performed for each subband. In addition, for example, a control frequency band at which scheduling information is transmitted may be designated only within a specific subband or designated for each subband among the plurality of subbands. In addition, for example, if a subband of a first UE and a subband of a second UE are different from each other among the subbands on which the transport block is transmitted, at least any one of subcarrier spacing of each of the different subbands and cyclic-prefix (CP) type may be different. Herein, since a specific example of each of the exemplary cases is the same as described above, redundant examples will be omitted.

Figure 10:
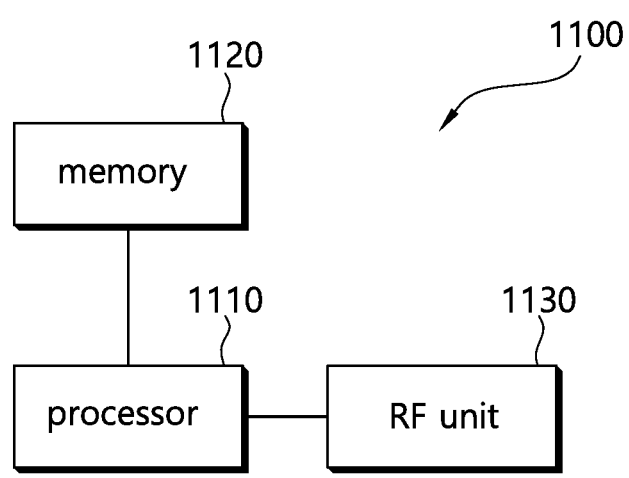
FIG. 10 is a block diagram of a communication device according to an embodiment of the present invention.

FIG. 10 is a block diagram of a communication device according to an embodiment of the present invention.

Referring to FIG. 10, a communication device 1100 includes a processor 1110, a memory 1120, and a radio frequency (RF) unit 1130. Herein, a communication device may be a device capable of transmitting and receiving a radio signal, and for example, may be a BS or a UE.

According to an embodiment, the processor 1110 may perform a function/operation/method described in the present invention. For example, the processor 1110 may be configured to determine a plurality of subbands by dividing the entire frequency band. In addition, the processor 1110 may be configured to transmit a transport block on at least one subband among the plurality of subbands. In this case, the processor 1110 may be configured such that a size of the transport block has a maximum value which is set to correspond to a size of the entire frequency band or a size of the subband.

The RF unit 1130 is connected to the processor 1110 and transmits and/or receives radio signals.

The processors may include an application-specific integrated circuit (ASIC), a separate chipset, a logic circuit, and/or a data processing device. The memories may include a read-only memory (ROM), a random access memory (RAM), a flash memory, a memory card, a storage medium, and/or other storage devices. The RF unit may include a baseband circuit for processing radio signals. When an embodiment is implemented in software, the aforementioned methods may be implemented with a module (process, function, or the like) to perform the aforementioned functions. The module may be stored in the memories and may be performed by the processors. The memories may be disposed inside or outside the processors and may be connected to the processors via various well-known means.

Examples for the aforementioned proposed method can be included as one of implementation methods of the present invention, and thus can be apparently regarded as a sort of proposed methods. In addition, although the aforementioned proposed methods can be independently implemented, it is also possible to be implemented by combining (or merging) some proposed methods. For example, the range of applying the proposed method of the present invention can also be extended to another system other than the 3GPP LTE system. For example, (some) proposed methods of the present invention may be extendedly applied not only to a UE with confined (or limited) capability (e.g., when maximum bandwidth capability of the UE is less than a (carrier (or CC or cell) related) system bandwidth) but also other UEs.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A communication method in a wireless communication system, the method performed by a user equipment (UE) and comprising:
   receiving configuration information, wherein the configuration information indicates to the UE at least one bandwidth part (BWP) which is configured to the UE; and
   receiving a transport block on the at least one BWP,
   wherein each of the at least one BWP is a part of an entire frequency band,
   wherein a maximum size of the transport block is configured based on a size of a BWP among the at least one BWP, where the transport block is allocated to the BWP, and
   wherein based on the transport block being related to a reference signal, a sequence of the reference signal is applied after being generated based on the entire frequency band and after being divided into a size corresponding to the BWP to which the transport block is allocated.

2. The method of claim 1, wherein at least one of a synchronization signal and system information is transmitted on the transport block.

3. The method of claim 1, wherein the transport block corresponding to a number of the at least one BWP is scheduled based on the maximum size of the transport block.

4. The method of claim 1, wherein at least one of a channel state information (CSI) measurement, a radio resource management (RRM) measurement, and a sounding reference signal (SRS) transmission is performed for each of the at least one BWP.

5. The method of claim 1, wherein a control frequency band, at which scheduling information is transmitted, is designated only within a specific BWP or designated for each BWP among the at least one BWP.

6. A user equipment (UE) comprising:
   a transceiver configured for transmitting and receiving a radio signal; and
   a processor operatively coupled to the transceiver, wherein the processor is configured to:
   receive configuration information, wherein the configuration information indicates to the UE at least one bandwidth part (BWP) which is configured to the UE; and
   receive a transport block on the at least one BWP,
   wherein each of the at least one BWP is a part of an entire frequency band,
   wherein a maximum size of the transport block is configured based on a size of a BWP among the at least one BWP, where the transport block is allocated to the BWP, and
   wherein based on the transport block being related to a reference signal, a sequence of the reference signal is applied after being generated based on the entire frequency band and after being divided into a size corresponding to the BWP to which the transport block is allocated.

* * * * *